United States Patent
Moriya et al.

(10) Patent No.: US 8,422,812 B2
(45) Date of Patent: Apr. 16, 2013

(54) IMAGE PROCESSOR AND METHOD THEREFOR, AND IMAGE DISPLAY DEVICE

(75) Inventors: Shotaro Moriya, Tokyo (JP); Noritaka Okuda, Tokyo (JP); Toshiaki Kubo, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1075 days.

(21) Appl. No.: 12/349,919

(22) Filed: Jan. 7, 2009

(65) Prior Publication Data

US 2009/0175558 A1   Jul. 9, 2009

(30) Foreign Application Priority Data

Jan. 8, 2008  (JP) ................... 2008-001205
Nov. 14, 2008  (JP) ................... 2008-292089

(51) Int. Cl.
*G06K 9/40* (2006.01)
*G06K 9/64* (2006.01)

(52) U.S. Cl.
USPC ........... 382/254; 382/260; 382/275; 382/274; 382/279; 382/264; 382/266

(58) Field of Classification Search ............. None
See application file for complete search history.

(56) References Cited

U.S. PATENT DOCUMENTS

| | | | | |
|---|---|---|---|---|
| 5,218,649 A * | 6/1993 | Kundu et al. | ........... | 382/180 |
| 5,231,677 A * | 7/1993 | Mita et al. | ........... | 382/266 |
| 5,418,899 A | 5/1995 | Aoki et al. | | |
| 5,576,837 A * | 11/1996 | Strolle et al. | ........... | 386/312 |
| 6,178,268 B1 * | 1/2001 | Furukawa et al. | ........... | 382/260 |
| 6,304,966 B1 * | 10/2001 | Shimizu | ........... | 713/100 |
| 6,668,097 B1 * | 12/2003 | Hu et al. | ........... | 382/275 |
| 7,151,863 B1 * | 12/2006 | Bradley et al. | ........... | 382/299 |
| 7,375,760 B2 * | 5/2008 | Kempf et al. | ........... | 348/441 |
| 2003/0091232 A1 * | 5/2003 | Kalevo et al. | ........... | 382/167 |
| 2004/0001642 A1 * | 1/2004 | Curry et al. | ........... | 382/260 |
| 2005/0053303 A1 * | 3/2005 | Blake et al. | ........... | 382/254 |
| 2005/0212728 A1 * | 9/2005 | Miller et al. | ........... | 345/76 |
| 2006/0018526 A1 * | 1/2006 | Avinash | ........... | 382/132 |
| 2008/0284987 A1 * | 11/2008 | Yonezawa | ........... | 353/70 |

FOREIGN PATENT DOCUMENTS

| | | |
|---|---|---|
| JP | 61-157164 | 7/1986 |
| JP | 5-183778 | 7/1993 |
| JP | 5-328106 A | 12/1993 |
| JP | 8-102900 A | 4/1996 |
| JP | 2001-505754 | 4/2001 |
| JP | 2002-278500 | 9/2002 |

* cited by examiner

*Primary Examiner* — Michelle Entezari
(74) *Attorney, Agent, or Firm* — Birch, Stewart, Kolasch & Birch, LLP

(57) ABSTRACT

An image processor is provided with the high-frequency component detecting unit that calculates a convolution for each of regions of interest in part of an image region of input image data, to output the high-frequency component detection result for each pixel of interest; the smoothing unit that smoothes the image data, to output the smoothed image data; and the image data processing unit that combines based on the high-frequency component detection result the image data with the smoothed image data, to output the combined image data; wherein the image data processing unit varies the combination rate for the smoothed image data, based on the high-frequency component detection result. Thereby, even when a region in the image data contains such high frequency components as a checkered pattern has, an image resistant to moiré that would be generated in magnifying or reducing of the image on a region basis can be displayed without deterioration of image quality.

12 Claims, 14 Drawing Sheets

CONVOLUTION PATTERN DATA

| 1 | -1 | 1 | -1 |
|---|---|---|---|

=PIXEL OF INTEREST

IMAGE DATA

| 255 | 0 | 255 | 0 | 255 | 0 | 255 | 255 | 255 | 255 | 255 | 255 |
|---|---|---|---|---|---|---|---|---|---|---|---|
| 0 | 255 | 0 | 255 | 0 | 255 | 255 | 255 | 255 | 255 | 255 | 255 |
| 255 | 0 | 255 | 0 | 255 | 0 | 255 | 255 | 255 | 255 | 255 | 255 |
| 0 | 255 | 0 | 255 | 0 | 255 | 255 | 255 | 255 | 255 | 255 | 255 |

←—CHECKERED PATTERN—→←—SOLID FILL REGION—→
REGION

CONVOLUTION CALCULATION RESULT

| 0 | 510 | -510 | 510 | -510 | 255 | -255 | 0 | 0 | 0 | 255 | 0 |
|---|---|---|---|---|---|---|---|---|---|---|---|
| 255 | -510 | 510 | -510 | -255 | -255 | 0 | 0 | 0 | 0 | 255 | 0 |
| 0 | 510 | -510 | 510 | -510 | 255 | -255 | 0 | 0 | 0 | 255 | 0 |
| 255 | -510 | 510 | -510 | -255 | -255 | 0 | 0 | 0 | 0 | 255 | 0 |

←—CHECKERED PATTERN—→←—SOLID FILL REGION—→
REGION

SMOOTHING COEFFICIENTS A

| 0.5 | 0.5 |
|---|---|

SMOOTHING COEFFICIENTS B

| 0.25 | 0.25 | 0.25 | 0.25 |
|---|---|---|---|

=PIXEL OF INTEREST

IMAGE DATA A

| 255 | 0 | 255 | 0 | 255 | 0 | 255 | 0 |
|---|---|---|---|---|---|---|---|
| 0 | 255 | 0 | 255 | 0 | 255 | 0 | 255 |
| 255 | 0 | 255 | 0 | 255 | 0 | 255 | 0 |
| 0 | 255 | 0 | 255 | 0 | 255 | 0 | 255 |

IMAGE DATA B

| 0 | 0 | 0 | 0 | 255 | 0 | 0 | 0 |
|---|---|---|---|---|---|---|---|
| 0 | 0 | 0 | 0 | 255 | 0 | 0 | 0 |
| 0 | 0 | 0 | 0 | 255 | 0 | 0 | 0 |
| 0 | 0 | 0 | 0 | 255 | 0 | 0 | 0 |

IMAGE DATA

CHECKERED PATTERN

| 255 | 0 | 255 | 0 |
|---|---|---|---|
| 0 | 255 | 0 | 255 |
| 255 | 0 | 255 | 0 |
| 0 | 255 | 0 | 255 |

VERTICAL STRIPE PATTERN

| 255 | 0 | 255 | 0 |
|---|---|---|---|
| 255 | 0 | 255 | 0 |
| 255 | 0 | 255 | 0 |
| 255 | 0 | 255 | 0 |

HORIZONTAL STRIPE PATTERN

| 255 | 255 | 255 | 255 |
|---|---|---|---|
| 0 | 0 | 0 | 0 |
| 255 | 255 | 255 | 255 |
| 0 | 0 | 0 | 0 |

CONVOLUTION PATTERN DATA

TaA FOR DETECTING THE CHECKERED PATTERN

| 1 | -1 | 1 | -1 |
|---|---|---|---|
| -1 | 1 | -1 | 1 |
| 1 | -1 | 1 | -1 |
| -1 | 1 | -1 | 1 |

TaB FOR DETECTING THE VERTICAL STRIPE PATTERN

| 1 | -1 | 1 | -1 |
|---|---|---|---|
| 1 | -1 | 1 | -1 |
| 1 | -1 | 1 | -1 |
| 1 | -1 | 1 | -1 |

TaC FOR DETECTING THE HORIZONTAL STRIPE PATTERN

| 1 | 1 | 1 | 1 |
|---|---|---|---|
| -1 | -1 | -1 | -1 |
| 1 | 1 | 1 | 1 |
| -1 | -1 | -1 | -1 |

=PIXEL OF INTEREST

FIG. 15

|  | | CONVOLUTION PATTERN DATA | | |
|---|---|---|---|---|
|  | | TaA FOR DETECTING THE CHECKERED PATTERN | TaB FOR DETECTING THE VERTICAL STRIPE PATTERN | TaC FOR DETECTING THE HORIZONTAL STRIPE PATTERN |
| IMAGE DATA | CHECKERED PATTERN | 2040 | 0 | 0 |
| | VERTICAL STRIPE PATTERN | 0 | 2040 | 0 |
| | HORIZONTAL STRIPE PATTERN | 0 | 0 | 2040 |

US 8,422,812 B2

IMAGE PROCESSOR AND METHOD THEREFOR, AND IMAGE DISPLAY DEVICE

BACKGROUND OF THE INVENTION

1. Field of the Invention

The present invention relates to an image processor and a method therefor, and an image display device. The invention particularly relates to those that receive an image having high spatial-frequency components.

2. Description of the Prior Art

In projection-type display devices such as rear projection televisions, image distortion such as keystone distortion arises from positional relation between the screen and the light emitting source, or image distortion arises from an aberration of an optical system. In order to correct such distortion, known are methods of projecting an image having been inversely transformed according to the distortion characteristic.

Among the methods, there is one that generates an image having an inverse distortion characteristic by processing its image signal, and a liquid crystal projector employing the method is proposed that corrects a keystone distortion by changing the number of pixels in a scan line on a predetermined scan-line number basis (refer to, for example, Japan Patent Application Laid-Open No. H08-102900 (paras. [0021] and [0027], and FIGS. 2 and 3).

However, in a case of magnifying or reducing an image with the number of pixels varied in accordance with the above-mentioned manner, for example, when an input image contains a larger magnitude of high frequency components, moiré is generated in its output image owing to an aliasing distortion caused by resampling the original image at a transformed pixel position, resulting in a problem with deterioration of image quality.

A method may generally be employed that prevent moiré from appearing by smoothing an image signal without taking into account the distribution of frequency components contained in the image data. Using the method, however, even a fine pattern or the like unrelated to the moiré becomes blurred, resulting in a problem with deterioration of image quality.

SUMMARY OF THE INVENTION

An object of the present invention is to provide an image processor, an image processing method therefor, and an image display device that obtains an image in which moiré is prevented from generating without deterioration of image quality even when the image partially contains such high frequency components as a checkered pattern has.

An image processor according to the invention is provided with a high-frequency component detecting unit that detects high frequency components contained in image data by calculating a convolution for a pixel or a pixel group of the image data, to output the detection result; a smoothing unit that smoothes the image data, to output the smoothed image data; and an image data processing unit that combines the image data with the smoothed image data at a combination ratio determined from the detection result, to output the combined image data.

An image display device according to the invention is provided with the image processor and an image display unit for displaying an image based on the image data output from the image processor.

An image processing method according to the invention includes a step of detecting high frequency components contained in image data by calculating a convolution for a pixel or a pixel group of the image data, and outputting the detection result; a step of smoothing the image data, and outputting the smoothed image data; and a step of combining the image data with the smoothed image data at a combination ratio determined from the detection result, and outputting the combined image data.

BRIEF DESCRIPTION OF THE DRAWINGS

FIG. 6 shows examples of input image data and a convolution result therefor calculated by the image processor according to Embodiment 1;

FIG. 15 is a table showing the convolution results calculated by the image processor according to Embodiment 2;

DESCRIPTION OF THE PREFERRED EMBODIMENTS

Embodiment 1

Figure 1:
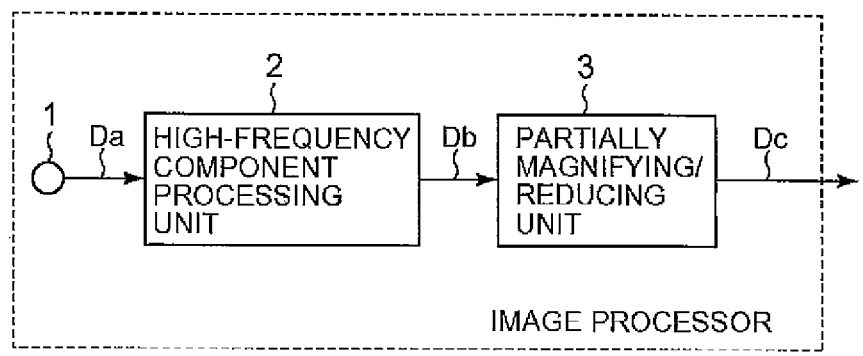
FIG. 1 is a block diagram illustrating a configuration of an image processor according to Embodiment 1 of the present invention.

FIG. 1 is a block diagram illustrating a configuration of an image processor according to Embodiment 1 of the present invention. The image processor can be used, for example, as part of an image display device typified by projection display devices such as rear projection televisions.

The image processor according to Embodiment 1 is provided with an input terminal 1, a high-frequency component processing unit 2, and a partially magnifying/reducing unit 3. Input image data Da is input into the high-frequency component processing unit 2 through the input terminal 1. The high-frequency component processing unit 2 smoothes high-frequency components contained in part of the input image data Da and combines the input image data Da with the smoothed image data by a later-described method, to output the combined image data Db. The partially magnifying/reducing unit 3 magnifies or reduces the combined image data Db on an image region basis, to output the partially magnified/reduced image data Dc. While the high-frequency component processing unit 2 and the partially magnifying/reducing unit 3 are configured in the same image processor as an example, shown in FIG. 1, such a configuration is not limited to that. For example, a plurality of image processors may be provided for the processing units 2 and 3 to be disposed each in separate processors.

Figure 2:
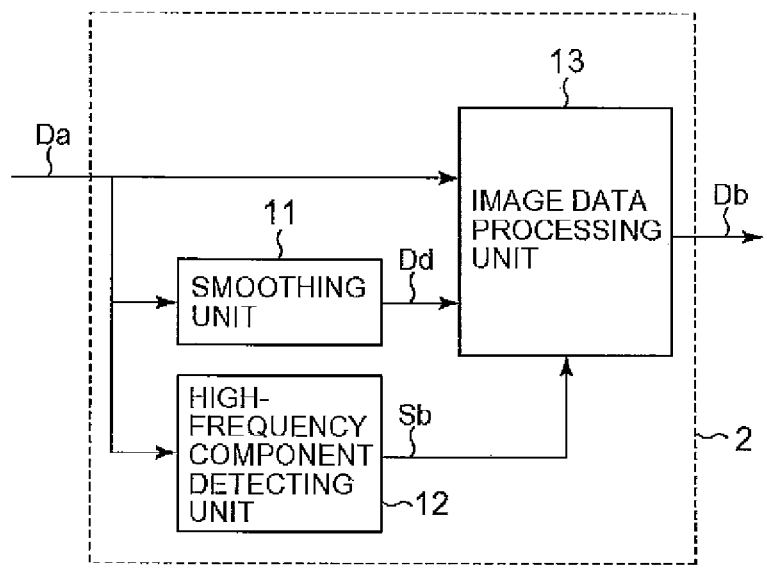
FIG. 2 is a block diagram illustrating a configuration of a high-frequency component processing unit in the image processor, according to Embodiment 1.

An internal configuration of the high-frequency component processing unit 2 will be described in detail. FIG. 2 is a block diagram illustrating an internal configuration of the processing unit 2. The high-frequency component processing unit 2 is provided with a smoothing unit 11, a high-frequency component detecting unit 12, and an image data processing unit 13. The smoothing unit 11 smoothes the input image data Da, to output the smoothed data as smoothed image data Dd. The high-frequency component detecting unit 12 detects on a pixel basis high frequency components contained in the input image data Da, to output the detection result as a high-frequency component detection result Sb for each pixel. The image data processing unit 13 combines the input image data Da with the smoothed image data Dd, based on the high-frequency component detection result Sb, to output the combined data as combined image data Db.

The smoothing unit 11, the high-frequency component detecting unit 12, and the image data processing unit 13 will be described below.

The smoothing unit 11 is firstly described. The smoothing unit 11 is configured with an averaging filter that averages values of a pixel of interest and pixels therearound and outputs the averaged value. In other words, the smoothed image data Dd is image data obtained by applying the averaging filter to the input image data Da.

Figure 3:
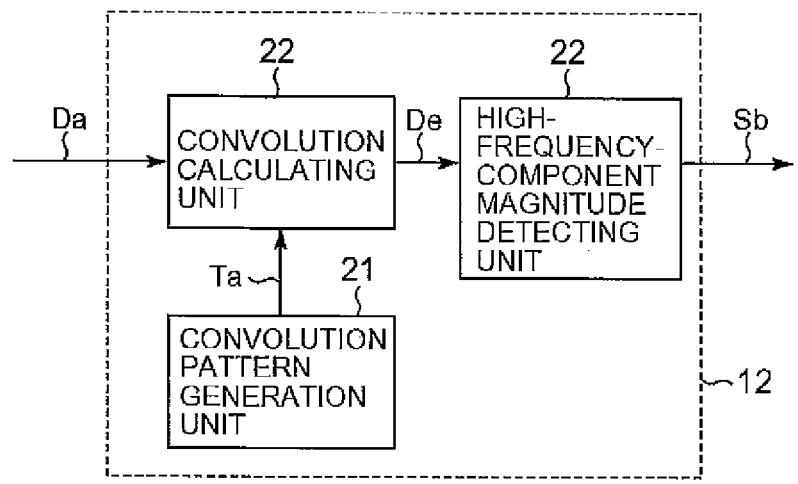
FIG. 3 is a block diagram illustrating a configuration of a high-frequency component detecting unit in the high-frequency component processing unit, according to Embodiment 1.

Next, the high-frequency component detecting unit 12 is described. FIG. 3 is a block diagram illustrating an internal configuration of the detecting unit 12: it is configured with a convolution pattern generating unit 21, a convolution calculating unit 22, and a high-frequency-component magnitude calculating unit 23. The convolution pattern generating unit 21 outputs convolution pattern data Ta. The convolution calculating unit 22 calculates a convolution of values of a pixel of interest and pixels therearound, and the convolution pattern data Ta for each pixel of interest that is included in part of the entire image region of the input image data Da, to output the result as a convolution result De. The high-frequency-component magnitude calculating unit 23 calculates the magnitude of the high frequency components contained in the input image data Da from the convolution result De, to output the high-frequency component detection result Sb that denotes a content ratio of high frequency components for each pixel of interest in the part of the entire display region.

Figure 4:
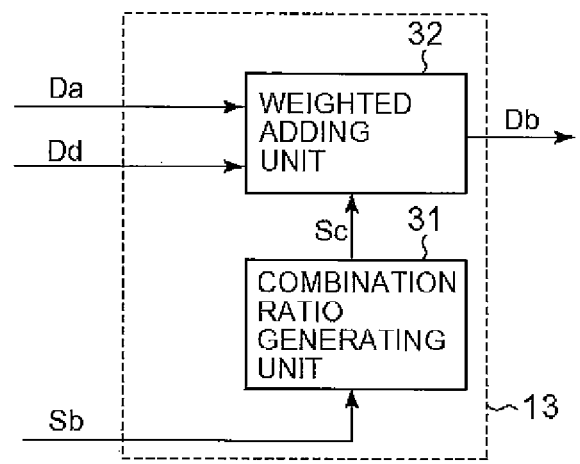
FIG. 4 is a block diagram illustrating a configuration of an image data processing unit in the high-frequency component processing unit, according to Embodiment 1.

Next, the image data processing unit 13 is described. FIG. 4 is a block diagram illustrating an internal configuration of the image data processing unit 13: it is configured with a combination-ratio generating unit 31 and a weighted adding unit 32. The combination-ratio generating unit 31 outputs a combination ratio Sc, which has a value equal to or larger than zero, calculated based on the high-frequency component detection result Sb. The weighted adding unit 32 performs, based on the combination ratio Sc, weighted adding of the input image data Da and the smoothed image data Dd, to output the result as the combined image data Db.

Defining as a maximum combination ratio $Sc_{max}$ a maximum value that the combination ratio Sc can takes, the combined image data Iid is expressed using the input image data Da and the smoothed image data Dd by the following equation (1):

$$Db=(Sc*Dd+(Sc_{max}-Sc)*Da)/Sc_{max}. \qquad (1).$$

The smoothed image data Dd here, since it has been obtained by applying the smoothing filter to the input image data Da, becomes image data without including high-frequency components that cause moiré, at the expense of being blurred with lost of details comparing to the input image data Da. However, the combination-ratio generating unit 31 increases a value of the combination ratio Sc for a region of interest (a pixel of interest in the embodiment), which is a part of the image region of the input image data Da, when the input image data Da in the region of interest contains a larger magnitude of moiré-causing high-frequency components, and decreases a value of the combination ratio Sc for a region of interest (a pixel of interest) when the input image data Da therein contains less moiré-causing high-frequency components, combined image data Db can be obtained that contains no moiré-causing high-frequency components with details of the image being kept intact.

In other words, the combination ratio Sc is a factor that controls a frequency pass-band of the high-frequency component processing unit 2 for the input image data Da. That is, the closer to the maximum combination ratio $Sc_{max}$ a value of the combination ratio Sc approaches, the lower the frequency pass-band becomes; and on the contrary, the closer to zero a value of the combination ratio Sc, the higher the frequency pass-band. Since the high-frequency component processing unit 2 according to Embodiment 1 operates in such a manner that a value of the combination ratio Sc for each region of interest (a pixel of interest) in the input image data Da is approached closer to the maximum combination ratio $Sc_{max}$ as more moiré-causing high frequency components are contained in a region of interest of the input image data Da, the frequency pass-band of the processing unit 2 is locally controlled, which allows eliminating moiré-causing high frequency components only, with details of the image being kept intact.

Next, a description is made of a method of calculating the above-mentioned high-frequency component detection result Sb that quantitatively indicates on a region of interest (a pixel of interest) basis a content ratio of high frequency components. The high-frequency component detection result Sb, by setting properly the convolution pattern data Ta in the high-frequency component detecting unit 12, becomes a value that quantitatively indicates how much magnitude of moiré-causing high frequency components is contained in the input image data Da. Since the combination ratio Sc is calculated from the high-frequency component detection result Sb in the combination-ratio generating unit 31, the combination ratio Sc can be approached closer to the maximum combination ratio $Sc_{max}$ as more contained are moiré-causing high frequency components, or closer to zero as less contained are moiré-causing high frequency components.

A detailed explanation will be made taking as an example a case of detecting a region particularly containing a checkered pattern among those containing moiré-causing high frequency components in an image. The checkered pattern is a pattern in which pixels each having different tones are periodically arranged in rows and columns and the difference in tone are expressed pixel by pixel. The pattern is viewed substantially as a background with a solid fill.

Figures 5, 6A, 6B:
FIG. 5 is a diagram showing an example of convolution pattern data used in the image processor according to Embodiment 1.

FIG. 5 shows an example of the convolution pattern data Ta generated by the convolution pattern generating unit 21, for detecting a region containing a checkered pattern. Rectangles shown in FIG. 5 each correspond to pixels of the input image data Da. In Embodiment 1, since one region is defined to be one pixel of the image data Da, the shaded pixel is supposed to be a region of interest, i.e., a pixel of interest. The numerals written in the rectangles are multiplier coefficients for values of the respective pixels in the convolution calculation.

Denoting a value of the pixel of interest as V(x), that of the pixel on the left of the pixel of interest as V(x−1), that of the pixel on the right of the pixel of interest as V(x+1), and that of the pixel next to the right side pixel as V(x+2), the convolution result De is expressed by the following equation (2) that includes four multiplication operations:

$$De=1*V(x-1)+(-1)*V(x)+1*V(x+1)+(-)*V(x+2) \quad (2).$$

The operands of the convolution calculation are values of a pixel group including at least a pixel of interest and the neighboring ones. The convolution pattern data Ta is composed of coefficients whose positive and negative signs are alternated (addition and subtraction are made alternately) for successive pixels in the pixel group to be the operands of the convolution calculation. Since each multiplier coefficient for the pixels has a value of either "−1" or "1" in the convolution calculation, the multiplication in the equation (2) can be expressed by addition and subtraction, i.e., the equation is equivalent to the following equation (3):

$$De=V(x-1)-V(x)+V(x+1)-V(x+2) \quad (3).$$

Whereas the equation (2) requires multiplication, the equation (3) can be calculated by only addition and subtraction, bringing about an advantage in realizing the calculation in hardware. That is, by composing convolution pattern data of coefficients each having a value of either "−1" or "1", packaging size of the hardware can be reduce.

FIG. 6 shows a relation between input image data Da and its convolution result De: FIG. 6A shows the input image data Da, and FIG. 6B, the convolution result De obtained by convolution calculation of the input image data Da shown in FIG. 6A and the convolution pattern data Ta shown in FIG. 5, where the input image is supposed to be a monochrome one. Rectangles shown in FIG. 6A each correspond to pixels of the image, and the numerals written in the rectangles indicate values of the respective pixels. Rectangles shown in FIG. 6B each also correspond to the pixels, and the numerals written in the rectangles indicate values obtained by the convolution calculation. When the convolution is calculated on a pixel of interest in proximity to the boundary of the image data, there exists no pixel with a value to be multiplied by part of the coefficients given by the convolution pattern data Ta. In that situation, the pixel is assumed to exist and have a value of zero.

The image in the left half region of FIG. 6A is a so-called checkered pattern in which neighboring pixels in the rows and the columns periodically vary in their values and contains moiré-causing high frequency components. The left region is hereinafter referred to as "checkered pattern region". In the image in the right half region, on the other hand, neighboring pixels do not vary in their values and contain none of moiré-causing high frequency components. The right region is hereinafter referred to as "filled-in region". As seen from the convolution result De shown in FIG. 6B, the convolution result De has a large absolute value in the checkered pattern region, a small one in the filled-in region, and medium one in the region near the boundary between the checkered pattern and the filled-in regions.

If the high-frequency-component magnitude calculating unit 23 outputs the absolute value of the convolution result De as a value of the high-frequency component detection result Sb, then the value of the detection result Sb becomes large for each pixel of interest in the checkered pattern region, small for that in the filled-in region, and medium for that in the region near the boundary between the checkered pattern and the filled-in regions.

In other words, by making use of the convolution calculation, it is possible to estimate quantitatively whether a specific pattern (or that corresponding to convolution pattern data Ta) is contained in input image data Da. Moreover, by setting convolution pattern data Ta to such periodic data as mentioned above, it is also possible to estimate quantitatively how much magnitude of high frequency components having a specific period (a checkered pattern in the above description) is contained in input image data Da.

In this way, a value of the high-frequency component detection result Sb varies continuously depending on how much magnitude of a checkered pattern (high frequency components) is contained in each pixel of interest in input image data Da, and becomes larger as the magnitude of the checkered pattern is larger. That is, the high-frequency component detection result Sb, which quantitatively indicates how much magnitude of troublesome high-frequency components is contained in the input image data Da, has a value of zero or larger, and denotes that the larger the value, the more the troublesome high-frequency components are contained in each pixel (region) of interest in the image data Da.

Since increasing the combination ratio Sc in the weighted addition of equation (1) eliminates high frequency components contained in input image data Da, a troublesome checkered pattern could be removed. Over elimination of the high frequency components, however, results in removal of details that is unwilling to be removed, such as a fine pattern (hereinafter referred to as "texture") in the input image data Da.

Hence, in order to eliminate only checkered pattern that contains moiré-causing high-frequency components while the texture is kept intact, a value of the combination ratio Sc is defined so as to become larger as the high-frequency component detection result Sb increases, as the following equation (4):

$$Sc = \begin{cases} 0 & \text{if} \quad Sb < Tb \\ Sc_{max} & \text{if} \quad Sb > T_{max} \\ Ka*(Sb-Tb) & \text{if} \quad Tb \leq Sb \leq T_{max} \end{cases} \quad (4)$$

The equation (4) is explained below.

1) When the high-frequency component detection result Sb has a value smaller than a threshold Tb (Sb<Tb), the combination ratio Sc is set to zero. The high-frequency component smoothing effect can thereby be suppressed for such a texture that the detection result Sb smaller than the threshold Tb is output therefor, that is, by setting appropriately the threshold Tb, the checkered pattern can be removed while the texture is kept intact.

2) On the other hand, when a large magnitude of high frequency components such as those in a checkered pattern are contained in a pixel of interest in an image region of the input image data Da, the high-frequency component detection result Sb has a large value. Hence, by defining a maximum threshold $T_{max}$, the pixel of interest is determined, when the detection result Sb is larger than the threshold $T_{max}$ (Sb>Tb), that it contains a large magnitude of such high frequency components as a moiré-causing checkered pattern has. In that situation, by setting the combination ratio Sc to the maximum combination ratio $Sc_{max}$, the checkered pattern can be effectively removed.

3) When a pixel of interest has a value of the high-frequency component detection result Sb equal to or larger than the threshold Tb and equal to or smaller than the maximum threshold $T_{max}$ (Tb≦Sb≦$T_{max}$), it is considered to be difficult to determine whether the pixel contains a texture or high frequency components such as those in a checkered pattern. Such a pixel of interest exists, for example, in a region near the boundary between a checkered pattern and a texture (hereinafter referred to as "boundary region"). If only processing of either smoothing or not smoothing (the combination ratio Sc is allowed only taking either zero or the maximum combination ratio $Sc_{max}$) is performed for such a boundary region, a discontinuity arises in the combined image data Db. That is, when the combination ratio Sc is selected to be zero, the input image data Da is output without modification; and when the combination ratio Sc is selected to be the maximum combination ratio $Sc_{max}$, the smoothed image data Dd is output. The input image data Da, since it contains high frequency components, is viewed as a clear image for the human eyes; however, the smoothed image data Dd, since it contains no high frequency components, is viewed as a blurred image for the human eyes. If only zero or the maximum combination ratio $Sc_{max}$ is allowed as a value of the combination ratio Sc, a clear image and a blurred image discontinuously appear in the boundary region, which makes the human feel unnaturally for his/her eyes. Moreover, when such an unnatural image portion (hereinafter referred to as "pseudo edge") appears in a motion picture, the portion is seen flickering for the human eyes, resulting in more increase of unnatural feeling.

Hence, when the high-frequency component detection result Sb has a value equal to the threshold Tb or larger and equal to the maximum threshold $T_{max}$ or smaller, the combination ratio Sc is set to increase gradually from zero to the maximum combination ratio $Sc_{max}$ as the high-frequency component detection result Sb increases. Accordingly, the combined image data Db becomes image data intermediate between the input image data Da and the smoothed image data Dd in the boundary region, which can blur the image therein. In other words, the image can be gradually changed in the boundary region. Since the human eyes are insensitive to gradual change, a pseudo edge does not appear that would arise if the combination ratio Sc was allowed only taking either zero or the maximum threshold $T_{max}$. That is, when the high-frequency component detection result Sb is equal to or larger than the threshold Tb and equal to or smaller than the maximum threshold $T_{max}$, the pseudo edge can be prevented from appearing by increasing monotonically the combination ratio Sc as the high-frequency component detection result Sb increases.

A slope Ka in the equation (4) is defined as the following equation (5):

$$Ka = Sc_{max}/(T_{max}-Tb) \quad (5).$$

Thus defining the slope Ka, the combination ratio Sc equals the maximum combination ratio $Sc_{max}$ when the high-frequency component detection result Sb becomes the maximum threshold $T_{max}$. Accordingly, the combination ratio Sc varies continuously with the high-frequency component detection result Sb varying from zero to the maximum threshold $T_{max}$ or larger.

For that reason, the combination ratio Sc smoothly varies with the high-frequency component detection result Sb for an image region including a boundary region, so that such processing as removing a checkered pattern can be achieved while suppressing the effect of smoothing high frequency components for a texture region and keeping intact a texture therein.

Figure 7:
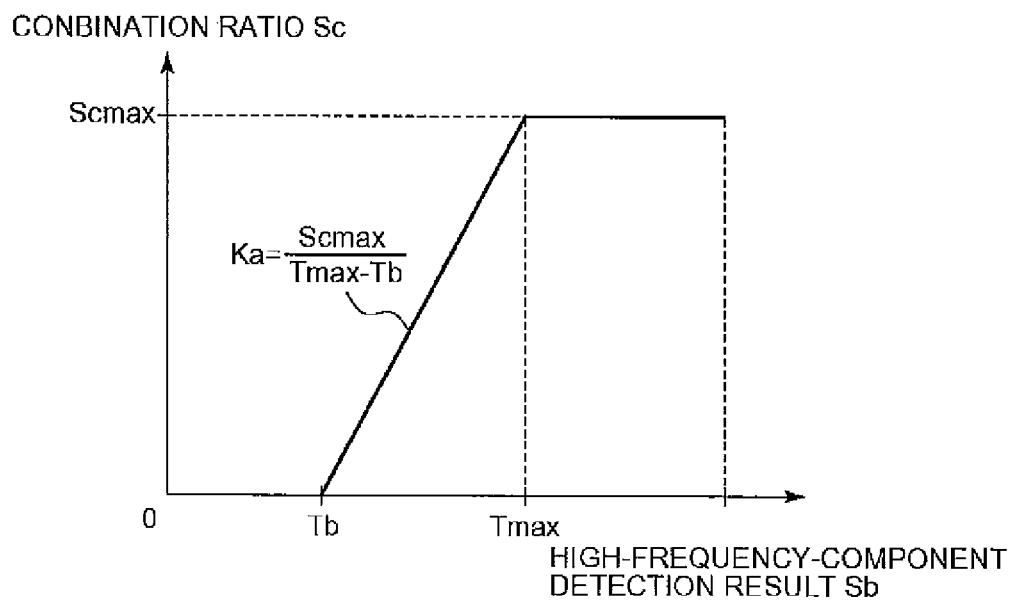
FIG. 7 is a graph showing a relation of combination ratios to high-frequency component detection results, used in the image processor according to Embodiment 1.

FIG. 7 is a graph showing a relation of the combination ratio Sc to the high-frequency component detection result Sb based on the calculations using the equations (4) and (5). The horizontal axis denotes the high-frequency component detection result Sb, and indicates how much magnitude of troublesome high-frequency components is contained in a region of interest (pixel of interest), the more the troublesome components, the larger a value of the high-frequency component detection result Sb. On the other hand, when components such as those in a texture that are desired to keep are largely contained in the region, the high-frequency component detection result Sb is considered a small value. As seen from FIG. 7, the combination ratio Sc approaches the maximum combination ratio $Sc_{max}$ as moiré-causing high-frequency components are largely contained in the input image data Da, and approaches zero, on the contrary, when less magnitude of moiré-causing high-frequency components is contained therein. Therefore, in the weighted adding unit 32, the combined image data Db without troublesome high-frequency components causing moiré can be obtained while keeping details of a texture intact.

In addition, when the high-frequency component detection result Sb being equal to or larger than the threshold Tb and equal to or smaller than the maximum threshold $T_{max}$, not limited to the equation (4) is an equation that makes the combination ratio Sc increase monotonically as the high-frequency component detection result Sb increases.

Moreover, while in Embodiment 1, the high-frequency component detection result Sb is calculated for each pixel of interest, calculation of the detection result Sb is not limited to that. Part of the image region composed of a plurality of pixels, of the input image data Da may be defined as a region of interest. In this case, the convolution may be calculated for a pixel group composed of a plurality of pixels included at least in the region of interest or for a pixel group composed of those only in the region of interest.

As has been described above, the combined image data Db output from the high-frequency component processing unit 2 contains no moiré-causing high-frequency components while keeping details of a texture intact. Then, the partially magnifying/reducing unit 3 magnifies or reduces on a region basis the combined image data Db having no moiré-causing high-frequency components, to output the partially magnified/reduced image data Dc. The image processor according to Embodiment 1 can therefore generate a moiré-suppressed excellent image.

Figure 8:
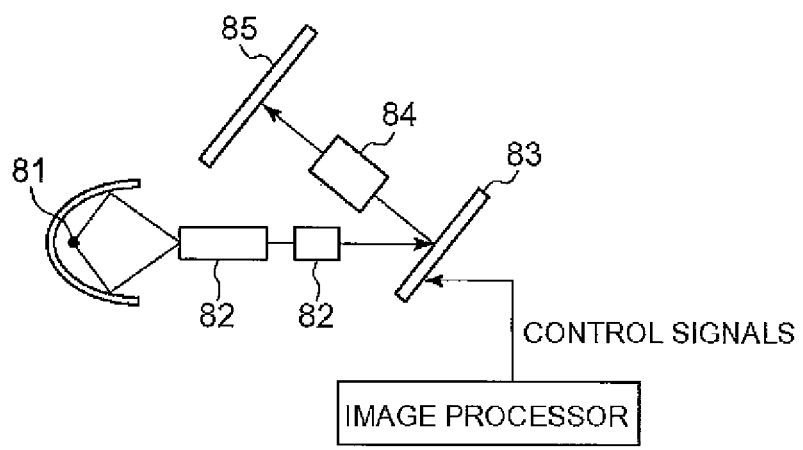
FIG. 8 is a diagram illustrating a configuration of an image display device that is provided with the image processor built therein, according to Embodiment 1.

FIG. 8 illustrates a configuration of an image display device typified by projection display devices, which is provided with the image processor built therein according to Embodiment 1 of the invention. As shown in FIG. 8, the image display device is configured in such a manner that light emitted from a light source 81 is incident onto a modulator 83 through various optical elements 82 and light having been modulated by the modulator 83 according to control signals is projected onto a screen 85 through an optical system composed of lenses 84 and the like. The above-described image processor is provided as a control unit, and the modulator 83 modulates (controls) its pixels according to the control signals having been generated from combined data in the image processor and output therefrom. In addition, the projection display device is not limited to that shown in FIG. 8: the above-described image processor may be applied to another type of projection display device.

As described before, the image processor includes thereinside the partially magnifying/reducing unit 3 for magnifying or reducing an image input thereinto on a region basis. The magnification and reduction are preferably performed, for example, with a characteristic inverse to that of an image distortion caused by the optical system of the image display device. Thereby, the image distortion can be corrected, so that the corrected image without distortion can be displayed on the screen 85. In addition, the magnification and reduction on a region basis are achieved by resampling an input image at a sampling interval (or pixel spacing) different from the original one that having been applied to the input image. For example, in a region to be partially magnified, the input image may be resampled at a sampling interval shorter than the original one, and in a region to be partially reduced, on the contrary, the input image may be resampled at a sampling interval longer than the original one.

In addition, if an image input into the partially magnifying/reducing unit 3 contains a periodic pattern whose interval is different from the resampling interval, interference between the periodic pattern and the resampling may sometimes occur in resampling the image, to cause moiré. Moreover, moiré is known that it occurs easily by interference between different high-frequency components.

In the image processor of Embodiment 1, the high-frequency component detecting unit 12 detects as the high-frequency component detection result Sb the magnitude of moiré-causing high-frequency components contained in an input image; the image data processing unit 13 generates based on the detection result Sb the combined image data Db containing no moiré-causing high-frequency components; and the partially magnifying/reducing unit 3 partially magnifies and reduces with a characteristic inverse to that of the optical system the combined image data Db. Then, by projecting the magnified/reduced image onto the screen 85 through the image projecting unit, the image with no moiré can be displayed thereon.

While, in the description of the internal configuration of the image processor, the smoothing unit 11 is explained that it is configured with an averaging filter that smoothes values of a pixel of interest and those therearound, and outputs the smoothed value, a means used for smoothing is not limited to this. Any means may be used therefor that outputs the average value of the pixel of interest and those therearound, i.e., that outputs a value obtained by a weighted addition of the pixel of interest and a plurality of pixels therearound.

The pixels to be weighted-added are limited to the pixel of interest and those therearound, and the number of pixels is preferably set less than that of pixels used in the convolution calculated in the convolution calculating unit 22.

Figures 9, 10:
FIG. 9 shows examples of different sets of smoothing coefficients used in the image processor according to Embodiment 1.
FIG. 10 shows different input image data for explaining a process of the image processor according to Embodiment 1.

FIG. 9 shows examples of smoothing coefficients of two averaging filters of different types. Smoothing coefficients A are used for calculating the average value of two pixels, i.e., a pixel of interest and that next thereto, and smoothing coefficients B, for calculating that of four pixels, i.e., a pixel of interest and those therearound. Supposing that the convolution calculation using the convolution pattern data Ta requires four pixel values as shown in FIG. 5, the difference between using the smoothing coefficients A and using the smoothing coefficients B in the calculation of the smoothing unit 11 is subsequently explained with reference to FIGS. 10 and 11.

FIG. 10 shows two kinds of image data A and B. FIG. 11A shows convolution result De and smoothed image data Dd both obtained when the image data A is input as input image data Da, and FIG. 11B shows convolution result De and smoothed image data Dd both obtained when the image data B is input as input image data Da. Here, the smoothed image data Dd obtained using the smoothing coefficients A and that obtained using the smoothing coefficients B are indicated as smoothed image data A and smoothed image data B, respectively. In addition, in the convolution calculation and the smoothing calculation on a pixel of interest that is in proximity to the boundary of the image data, there exists no exists with a value necessary for the calculations using part of coefficients thereof. In that situation, the pixel is assumed to exist and have a value of zero.

In FIG. 10, the image data A expresses a checkered pattern, and the image data B expresses one vertical line. Since the image data A causes moiré, its high frequency components needs to be eliminated. On the other hand, the vertical line expressed by the image data B contains also high frequency components, but has no periodicity (no repeatability). Since the vertical line therefore causes no moiré, its high frequency components do not need to be eliminated.

Firstly explained is the situation where the image data A (checkered pattern) is input as input image data Da. The convolution result De of the image data has large absolute values as shown in FIG. 11A. Accordingly, values of the combination ratio Sc for the input image data A become large, so that combined image data Db therefor contains the smoothed image data Dd at a larger ratio than the input image data Da.

As shown in FIG. 11A, the smoothed image data A generated using the smoothing coefficients A and the smoothed image data B generated using the smoothing coefficients B both show sufficient smoothing of the image data A (checkered pattern). Since the substantially same data is obtained as the smoothed image data Dd by using either smoothing coefficients A or B, both coefficients A and B have the same effect in sense of processing checkered patterns.

Next, explained is the situation where the image data B (vertical line) is input as input image data Da. As shown in FIG. 11B, the convolution result De of the image data has certain absolute values in four-pixel regions including the vertical line, which regions correspond to the convolution pattern data Ta. Accordingly, the combination ratio Sc for the four pixels has certain values, which indicates that combined image data Db contains to some extent the smoothed image data Dd.

As shown in FIG. 11B, the width of the vertical line in the smoothed image data Dd is of two pixels in the case of using the smoothed image data A on the one hand, and of four pixels in that of using the smoothed image data B on the other hand. As for the combined image data Db obtained by the weighted combination of the image data B and its smoothed image data Dd, when the smoothed image data A is employed as the smoothed image data Dd, spread of the vertical line is suppressed to two pixels in the combined image data Db. When the smoothed image data B is employed as the smoothed image data Dd, on the other hand, the width of the vertical line is spread to four pixels in the combined image data Db, which gives an impression that the vertical line becomes blurred.

Namely, while the smoothing coefficients A and B both have the same effect in the sense of processing periodic image data such as a checkered pattern containing moiré-causing high-frequency components, the smoothing coefficients A is superior in the sense of keeping details of an image typified by the vertical line that causes no moiré even though it contains high frequency components. This implies that when high-frequency component detection result Sb has a large value in a situation where pixels of interest display just part of the line of a letter, which does not cause moiré because of no periodicity but is regarded to have high frequency components, blurring of the letter can be reduced more using the smoothing coefficients A.

Namely, even when such image data Da is input that large values of the high-frequency component detection result Sb are possibly output by the high-frequency component detecting unit 12, local details can be kept in the smoothed image data Dd by limiting pixels used in calculating the smoothed image data Dd to a pixel of interest and that next thereto to be smoothed. In practice, by setting the number of pixels used in the calculation of the smoothed image data Dd smaller than that of pixels used in the convolution calculation, pixels used in the calculation of smoothed image data Dd can be limited to a pixel of interest and those therearound. In addition, while the weighting factors of the smoothing coefficients A are set the same for the pixel of interest and the next one in the calculation, setting a weighting factor for the pixel of interest larger than that for the next one in the calculation, for example, the larger a weighting factor for a pixel is set, the nearer to the pixel of interest the pixel is, can also bring about the effect of keeping local details. By appropriately setting the smoothing coefficients in this way, combined image data Db can be generated with troublesome high-frequency components being eliminated while keeping details of image. Note that the number of pixels necessary for calculating smoothed image data Dd is at least two in term of average calculation.

As described above, an image processor according to Embodiment 1 is provided with the high-frequency component detecting unit 12 for calculating a convolution for each of regions of interest in part of an image region of input image data Da, to output the high-frequency component detection result Sb for each region of interest; the smoothing unit 11 for smoothing the image data Da, to output the smoothed image data Dd; and the image data processing unit 13 for combining based on the high-frequency component detection result Sb the image data Da with the smoothed image data Dd, to output the combined image data Db; wherein the image data processing unit 13 varies combination rate Sc of the smoothed image data Dd, based on the high-frequency component detection result Sb (the combination rate Sc of the smoothed image data Dd is increased as the high-frequency component detection result Sb becomes large). Therefore, even when such high frequency components as those in the checkered pattern are contained in the region of the image data Da, a texture region can be blurred without deterioration of image quality, and an image can be displayed that is resistant to moiré, which would be generated in magnifying or reducing the image on a region basis.

In particular, since the region of interest is composed of one pixel, the combination ratio Sc of the smoothed image data Dd to the image data Da can be varied on a pixels basis. An image resistant to moiré generation can therefore be more efficiently displayed without deterioration of image quality.

Moreover, the high-frequency component detecting unit 12 is provided with the convolution pattern generating unit 21 for generating convolution pattern data Ta for the convolution calculation; the convolution calculating unit 22 for calculating a convolution of the image data Da and the convolution pattern data Ta for each region of interest, to output the convolution result De; and the high-frequency-component magnitude calculating unit 23 for outputting as the high-frequency component detection result Sb the absolute value of the convolution result De for each region of interest; wherein the convolution is calculated for at least a pixel group composed of a plurality of pixels including the region of interest, and the convolution pattern data Ta is composed of coefficients whose positive and negative signs are alternately changed for each of successive pixels in the pixel group to be calculated. Therefore, a region containing moiré-causing periodic high-frequency components such as those in a checkered pattern can be steadily detected.

Furthermore, since the convolution pattern data Ta is composed of coefficients of "1" and "−1", multiplication can be omitted, simplifying a circuit configuration for the convolution calculation.

Since the smoothing unit 11 generates the smoothed image data Dd for each of pixels of interest in the image region of the input image data Da, from data of pixels in a region to be smoothed that is composed of a pixel of interest and pixels therearound, and the number of pixels in the region is set smaller than that of pixels in a pixel group to be convolution-calculated, the region to be smoothed is limited to a pixel of interest and pixels therearound. Accordingly, even when high frequency components are detected that have no periodicity and cause no moiré, blurring of the image in the region can be reduced.

Moreover, since the region to be smoothed is composed of a pixel of interest and an adjacent pixel, the region is limited to a pixel of interest and an adjacent pixel. Accordingly, even when high frequency components are detected that have no periodicity and cause no moiré, blurring of the image in the region can be more effectively reduced.

Furthermore, the image processor according to Embodiment 1 is provided with the high-frequency component processing unit 2 and the partially magnifying/reducing unit 3 for magnifying or reducing at least part of the combined image data Db output from the processing unit 2. Accordingly, if the partially magnifying/reducing unit 3 has, for example, a transform function whose characteristic is inverse to that of a keystone distortion, the keystone distortion can be corrected. At the same time, even when such high frequency components as those in a checkered pattern are contained in a region of the image data Da, a texture region can be blurred without deterioration of image quality, and an image can be displayed that is resistant to moiré, which would be generated in magnifying or reducing the image. Moreover, since the partially magnifying/reducing unit 3 has a transform function of magnifying and reducing part of an image, the layout of the image can also be varied in a various way.

Furthermore, an image display device according to Embodiment 1 is provided with the image processor and the image projecting unit having an optical system through which image data output from the image processor is projected. The image processor is provided with the high-frequency component detecting unit for detecting high frequency components in input image data by calculating a convolution for a pixel or a pixel group of the image data, to output the detection result; the smoothing unit for smoothing the input image data, to output the smoothed image data; the image data processing unit for combining the input image data with the smoothed image data at a combination ratio determined from detection result, to output the combined image data; and the partially magnifying/reducing unit for magnifying and reducing the combined image data output from the image data processing unit, for each of regions of the image using a characteristic inverse to that of an optical system of the image projecting unit. Accordingly, even when, for example, a keystone distortion arises from image light being projected obliquely to the projected screen by the optical system of the image projecting unit, the keystone distortion resulting from the oblique projection can be corrected if the partially magnifying/reducing unit 3 has a transform function whose characteristic is inverse to that of the optical system or the keystone distortion. At the same time, even when such high frequency components as those in a checkered pattern are contained in a region in the image data Da, a texture region can be blurred without deterioration of image quality, and an image can be displayed that is resistant to moiré, which would be generated in correcting the keystone distortion.

Embodiment 2

While the high-frequency component processing unit 2 performs its processing using a pixel of interest, and a horizontal neighboring pixel or horizontal neighboring pixels in Embodiment 1, pixels used in the processing are not limited to this. For example, an image data holding unit may be provided in a high-frequency component processing unit so that it performs processing using vertically neighboring pixels in addition to the horizontal ones. Since configurations other than the high-frequency component processing unit are the same as those in Embodiment 1, their explanations are omitted here.

Figures 11, 12:
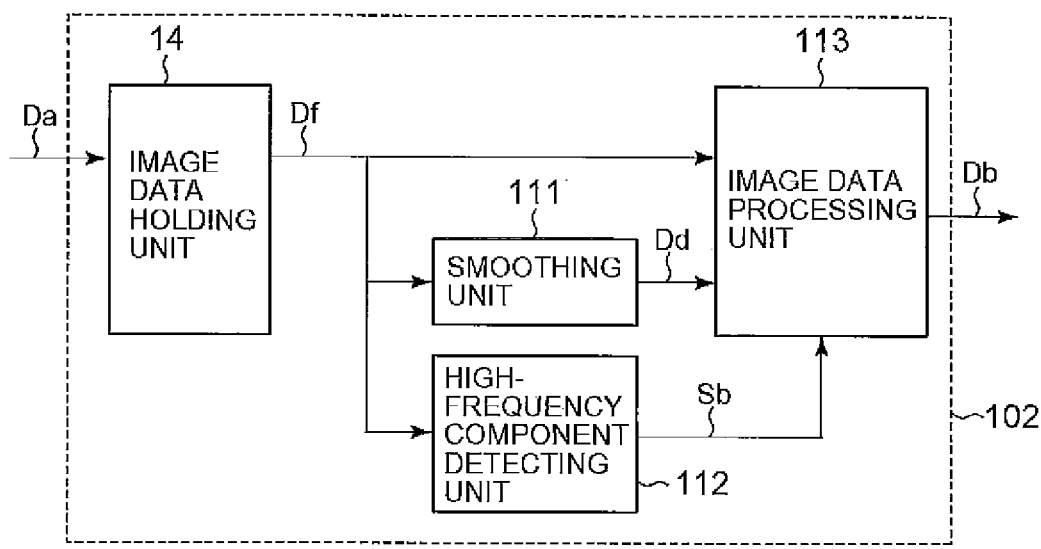
FIG. 11 shows convolution and smoothing results for the different input image data using the different smoothing-coefficient sets, calculated by the image processor according to Embodiment 1.
FIG. 12 is a block diagram illustrating a configuration of a high-frequency component processing unit of an image processor according to Embodiment 2 of the invention.

FIG. 12 is a block diagram illustrating a configuration of a high-frequency component processing unit 102 of an image processor according to Embodiment 2. An image data holding unit 14 has a memory that holds image data for one line or that for a plurality of lines of the input image data Da and output the image data as plural-line image data Df.

A smoothing unit 111 performs smoothing processing with reference to horizontally and vertically neighboring pixels. Since other operations of the smoothing unit than that referring to not only horizontally neighboring pixels but also vertically neighboring ones, are the same as Embodiment 1, their detailed explanations are omitted. As for an image data processing unit 113, its operations are the same as Embodiment 1; hence, their explanations are also omitted.

Figure 13:
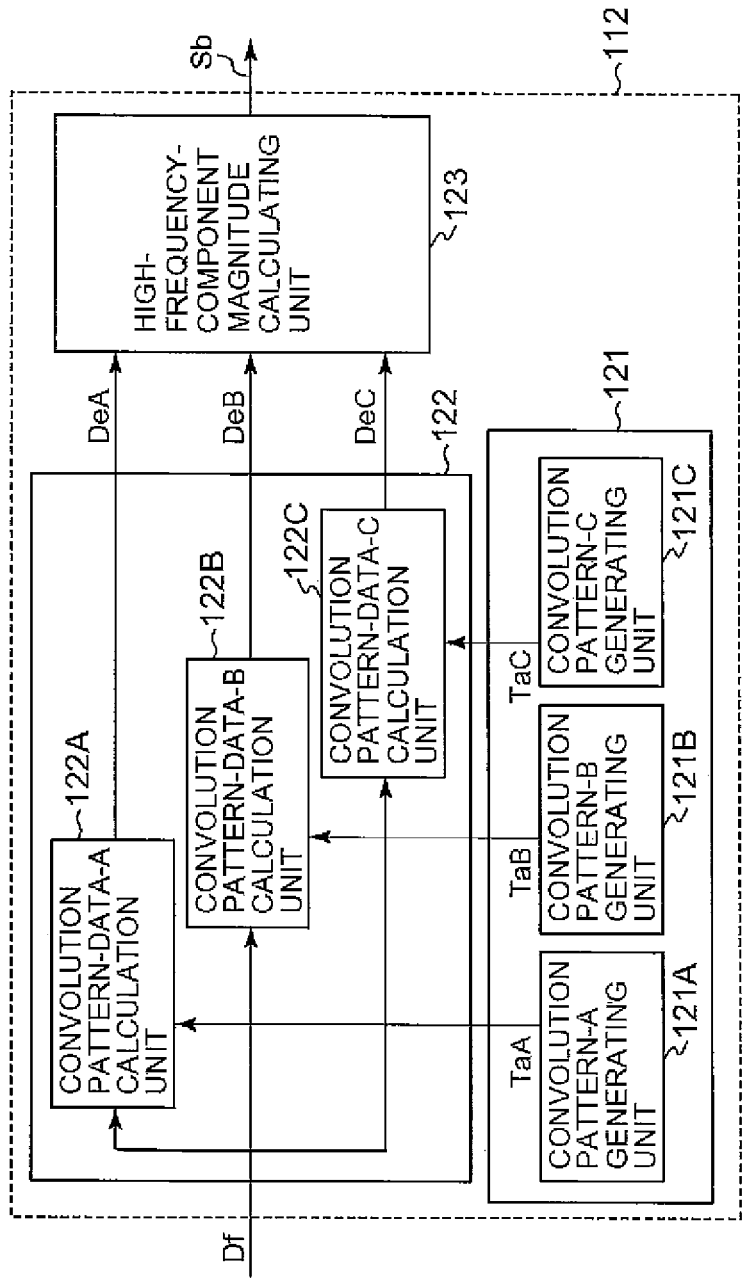
FIG. 13 is a block diagram illustrating a configuration of a high-frequency component detecting unit in the high-frequency component processing unit, according to Embodiment 2.

Next, a high-frequency component detecting unit 112 will be described. An internal configuration of the high-frequency component detecting unit 112 is illustrated in FIG. 13: it is provided with a convolution pattern generating unit 121, a convolution calculating unit 122, and a high-frequency-component magnitude calculating unit 123. The convolution pattern generating unit 121 is configured with a convolution pattern-A generating unit 121A that generates convolution pattern data TaA, a convolution pattern-B generating unit 121B that generates convolution pattern data TaB, and a convolution pattern-C generating unit 121C that generates convolution pattern data TaC The convolution calculating unit 122 is configured with a convolution-A calculating unit 122A that calculates a convolution of the image data Df and the pattern data TaA, to generate the convolution result DeA, a convolution-B calculating unit 122B that calculates a convolution of the image data Df and the pattern data TaB, to generate the convolution result DeA, and a convolution-C calculating unit 122C that calculates a convolution of the image data Df and the pattern data TaC, to generate the convolution result DeC Since the convolution pattern generating unit 121 generates a plurality of convolution pattern data such as the convolution pattern data TaA, TaB, and TaC, the high-frequency component detecting unit 112 according to Embodiment 2 can detect not only such a checkered pattern described above but also various patterns containing moiré-causing high frequency components.

Figures 14A, 14B:
FIG. 14 shows examples of image data to be processed that contains moiré-causing high frequency components and convolution pattern data used for detecting the components, by the image processor according to Embodiment 2.

FIG. 14A shows image data of a checkered pattern, a vertical stripe pattern, and a horizontal stripe pattern as typical patterns that contain periodic moiré-causing high-frequency components. The vertical stripe pattern includes pixels of the same tone arranged in columns and those of different tones arranged periodically in rows, and the horizontal stripe pattern includes pixels of the same tone arranged in rows and those of different tones periodically arranged in columns. FIG. 14B shows the convolution pattern data TaA for detecting the checkered pattern, the convolution pattern data TaB for the vertical stripe pattern, and the convolution pattern data TaC for the horizontal stripe pattern.

The positive and negative signs (determination factors for addition or subtraction) are assigned to the pixels of the convolution pattern data TaA as arranged in a checkered pattern, to those of the convolution pattern data TaB in a vertical stripe pattern, and to those of the convolution pattern data TaC in a horizontal stripe pattern.

FIG. 15 is a table showing convolution results of the image data shown in FIG. 14A and the convolution pattern data shown in FIG. 14B. It is found that larger absolute values are obtained in the convolution result DeA of the checkered pattern image data using the convolution pattern data TaA, in the convolution result DeB of the vertical-stripe image data using convolution pattern data TaB, and in the convolution result DeC of the horizontal-stripe image data using the convolution pattern data TaC.

In this way, by using the convolution pattern data TaA, TaB, and TaC simulating patterns containing high frequency components necessary to be detected, the high-frequency component detection result Sb that qualitatively indicates how much magnitude of troublesome high-frequency components is contained can be generated from the convolution results DeA, DeB, and DeC in the high-frequency-component magnitude calculating unit 123. Such a high-frequency component detection result Sb is also obtained by employing, for example, the maximum value among absolute values of the convolution results DeA, DeB and DeC, or the summation of squares of these convolution results. In addition, the processing of the high-frequency-component magnitude calculating unit 123 may be modified depending on a detected high frequency components of a pattern by comparing the convolution results DeA, DeB, and DeC, for example, when the magnification or reduction made in the partially magnifying/reducing unit 3 at the later stage is in the horizontal directions only, the convolution result DeC, which indicates the presence of horizontal stripes in an image, is not employed in calculating the detection result Sb since horizontal magnifying or reducing of such horizontal stripes has little effect on moiré.

As described above, the high frequency component processing 102 of an image processor according to Embodiment 2 is configured with the image data holding unit 14 for holding and outputting plural-line image data Df of image data Da; the convolution pattern generating unit 121 for generating the two dimensional convolution pattern data TaA, TaB, and TaC corresponding to different types of patterns containing high frequency components, such as those in a checkered pattern, a vertical stripe pattern, and a horizontal stripe pattern, respectively; and the convolution calculating unit 122 for calculating the convolution of the output plural-line image data Df and the two dimensional pattern data TaA, TaB, and TaC, to output the respective convolution results DeA, DeB, and DeC. Therefore, various types of high frequency components contained in input image data Da can be accurately detected as well as image processing can be performed as adapted to each of the types of the components, which allows a texture region to be effectively blurred without deterioration of image quality, and allows an image to be displayed that is resistant to moiré, which would be generated in magnifying or reducing the image.

Embodiment 3

In the above descriptions of Embodiment 1 and Embodiment 2, the input image data Da has been supposed to be a monochrome one, i.e., to have one channel; however, the number of channels conceivable for input image data Da is not limited to one. For example, when the input image data Da is color image data, the number of its channels is three since the image data Da is separated into three-color components of red, green, and blue (R, G, B). Processing of an image processor according to Embodiment 3 will be described of a case of a plurality of channels, taking as an example a case where input image data Da has three channels. In cases of the number of channels other than three, configuring similarly to Embodiment 3 respective constituent elements according to the number of channels would make it feasible to provide an image processor according to the invention.

Figure 16:
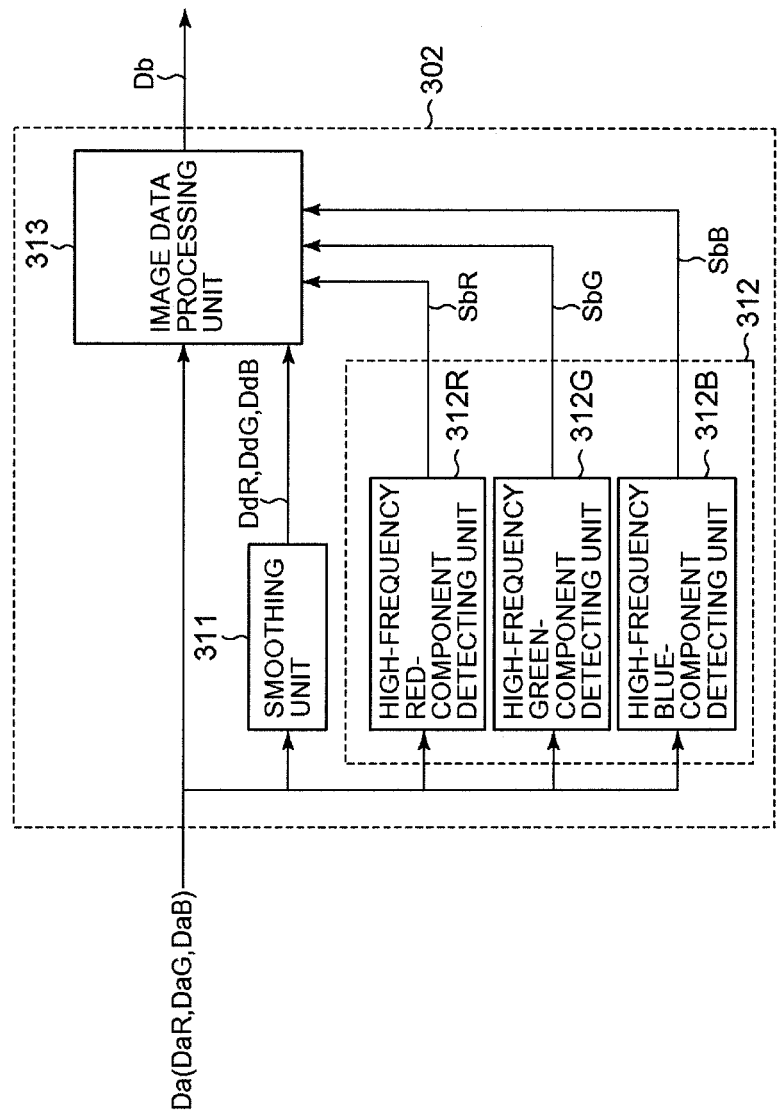
FIG. 16 is a block diagram illustrating a configuration of a high-frequency component processing unit of an image processor according to Embodiment 3 of the invention.

FIG. 16 is a block diagram illustrating a configuration of a high-frequency-component processing unit 302 of the image processor according to Embodiment 3. Since configurations other than the high-frequency-component processing unit 302 of the image processor are the same as Embodiment 1 and Embodiment 2, their explanations are omitted here. The high-frequency-component processing unit 302 is configured with a smoothing unit 311, a high-frequency-component detecting unit 312, and an image data processing unit 313. A configuration of the high-frequency-component processing unit 302 is not limited to this: the image data holding unit 14 may be provided therein similarly to Embodiment 2.

The input image data Da is composed of individual color-component image data having respective color components: red-component input image data DaR, green-component input image data DaG, and blue-component input image data DaB. The smoothing unit 311 smoothes the red-component input image data DaR, the green-component input image data DaG, and the blue-component input image data DaB, to output the smoothed red-component image data DdR, the smoothed green-component image data DdG, and the smoothed blue-component image data DdB, respectively, i.e., the smoothing unit 311 outputs the smoothed color-component image data on a color component basis. The high-frequency component detecting unit 312 configured with a high-frequency red-component detecting unit 312R for detecting high frequency components Contained in the red-component input image data DaR, to output the detected result as a high-frequency red-component detection result SbR; a high-frequency green-component detecting unit 312G for detecting high frequency components contained in the green-component input image data DaG, to output the detected result as a high-frequency green-component detection result SbG; and a high-frequency blue-component detecting unit 312B for detecting high frequency components contained in the blue-component input image data DaB, to output the detected result as a high-frequency blue-component detection result SbB. That is, the high-frequency component detecting unit 312 generates individual high-frequency color-component detection results from color-component image data having a plurality of color components. Individual operations of the high-frequency red-component detecting unit 312R, the high-frequency green-component detecting unit 312G, and high-frequency blue-component detecting unit 312B are substantially the same as those of the high-frequency component detecting units 12 or 112.

Figure 17:
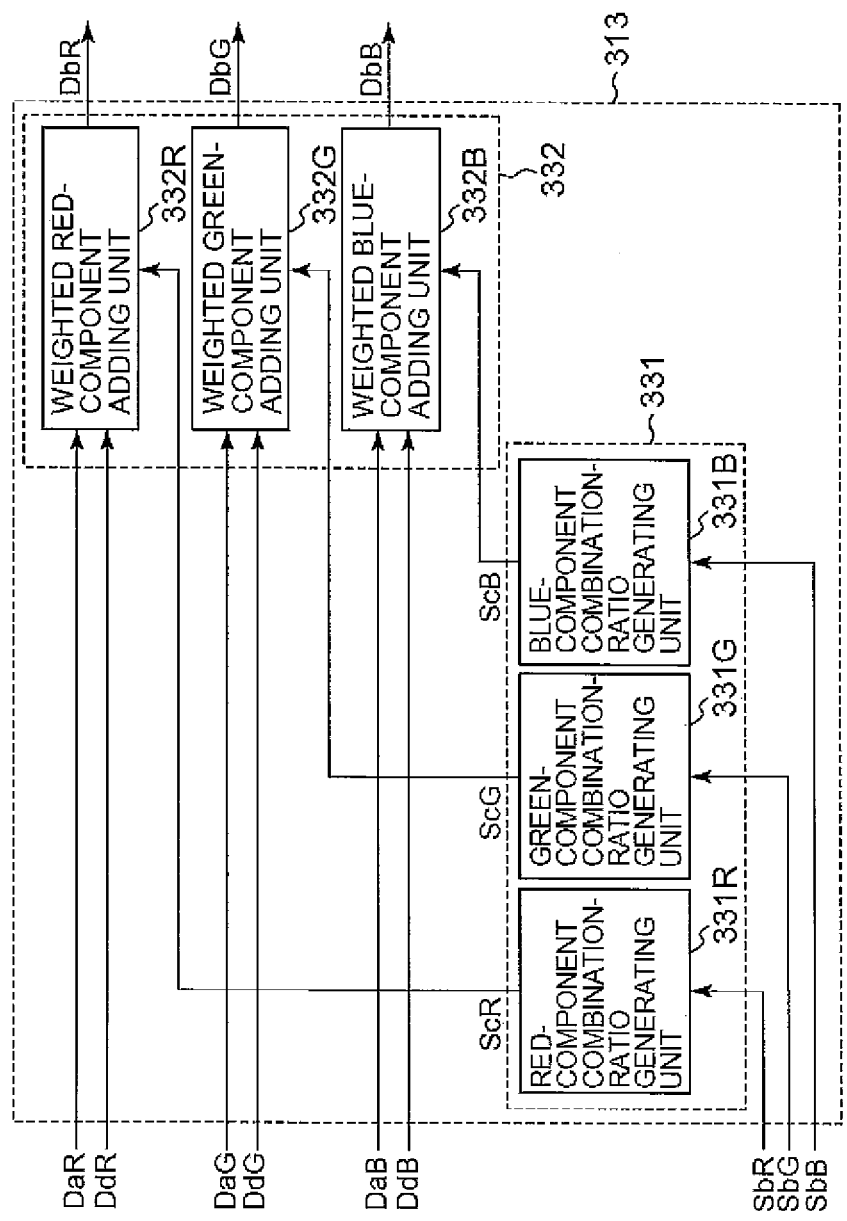
FIG. 17 is a block diagram illustrating a configuration of an image data processing unit of the image processor according to Embodiment 3.

FIG. 17 is a block diagram illustrating a configuration of the image data processing unit 313: it is configured with a combination-ratio generating unit 331 and a weighted adding unit 332. The combination-ratio generating unit 331 is provided with a red-component combination-ratio generating unit 331R, a green-component combination-ratio generating unit 331G, and, a blue-component combination-ratio generating unit 331B. These units each operate similarly to the combination-ratio generating unit 31 and output respective color-component combination ratios ScR, ScG, and Sec. The weighted adding unit 332 is provided with a red-component weighted adding unit 332R, a green-component weighted adding unit 332G, and a blue-component weighted adding unit 332B, and these units each operate similarly to the weighted adding unit 32. That is, the red-component weighted adding unit 332R weighted-combines based on the red-component combination ratio ScR the red-component input image data DaR with the smoothed red-component image data DdR, to output the weighted combination result as combined red-component image data DbR; the green-component weighted adding unit 332G weighted-combines based on the green-component combination ratio ScG the green-component input image data DaG with the smoothed green-component image data DdG, to output the weighted combination result as combined green-component image data DbG; and the blue-component weighted adding unit 332B weighted-combines based on the blue-component combination ratio ScB the blue-component input image data DaB with the smoothed blue-component image data DdB, to output the weighted combination result as combined blue-component image data DbB. In summary, the image data processing unit 313 individually combines, based on the high-frequency color-component detection results being output for each of a plurality of color components, the color-component input image data with the respective smoothed color-component image data, to output the respective combined color-component image data. With such operation of image data processing unit 313, moiré-causing high-frequency components can be eliminated even when input image data Da is composed of a plurality of channels, such as color image data is.

As described above, an image processor according to Embodiment 3 is configured in such a manner that, for input image data Da that is composed of color-component image data having a plurality of respective color components, for example, color-component image data DaR, DaG, and DaB having a red, a green, and a blue components, respectively, the high-frequency component detecting unit 312 detects high-frequency color components from the color-component image data DaR, DaG, and DaB, to generate the respective high-frequency color-component detection results SbR, SbG, and SbB; the smoothing unit 311 smoothes the color-component image data DaR, DaG, and DaB on a color component basis, to output the respective smoothed color-component image data DdR, DdG, and DdB; and the image data processing unit 313 combines the color-component image data DaR, DaG, and DaB with the smoothed color-component image data DdR, DdG, and DdB, based on the high-frequency color-component detection results SbR, SbG, and SbB, to output the combined color-component image data DbR, DbG, and DbB, respectively. Therefore, even when input image data Da is composed of a plurality of channels as color image data is, a texture region can be blurred without deterioration of image quality, and an image can be displayed that is resistant to moiré, which would be generated in magnifying or reducing the image.

Embodiment 4

Figure 18:
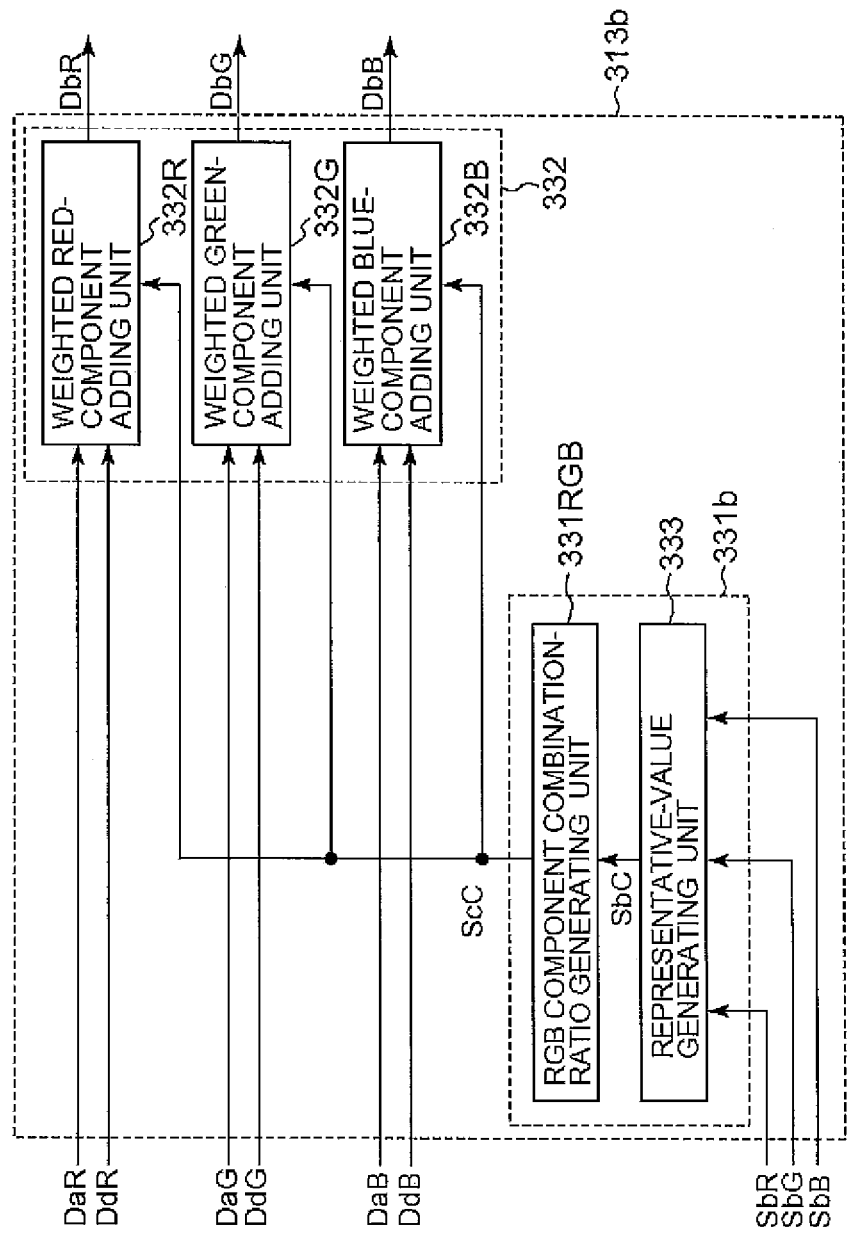
FIG. 18 is a block diagram illustrating a configuration of an image data processing unit of an image processor according to Embodiment 4 of the invention.

FIG. 18 is a block diagram illustrating a configuration of an image data processing unit 313*b* of an image processor according to Embodiment 4. In Embodiment 4, only a combination-ratio generating unit 331*b* is different from and others are the same as, those with Embodiment 3 (FIG. 17), i.e., the combination-ratio generating unit 331*b* is configured with a representative-value generating unit 333 and a RGB combination-ratio generating unit 331RGB. The representative-value generating unit 333 generates a representative value of the three-color components from the high-frequency color-component detection results SbR, SbG, and SbB for three-color components: red, green, and blue components, and outputs the detection result as a representative high-frequency component detection result SbC. For example, a maximum value, a minimum value, or an average value of the high-frequency color-component detection results SbR, SbG, and SbB for each pixel may be employed as the representative high-frequency component detection result SbC. The RGB combination-ratio generating unit 331RGB generates from the representative high-frequency component detection result SbC, a common combination ratio ScC that is common to the three-color components, to output the common combination ratio ScC into each of color-component weighted adding units 332R, 332G, and 332B of the weighted adding unit 332. That is, the image data processing unit 313*b* calculates the common combination ratio ScC common to the three-color components from the high-frequency color-component detection results SbR, SbG, and SbB for three-color components: red, green, and blue components, and combines the color-component image data DaR, DaG, and DaB with the smoothed color-component image data DdR, DdG, and DdB, based on the calculated common combination ratio ScC, to output the combined color-component image data DbR, DbG, and DbB, respectively. Note that the common combination ratio ScC is calculated in the same manner as that of the combination-ratio generating unit 31.

The common combination ratio ScC is a factor that determines a frequency pass-band for the input color-component image data DaR, DaG, and DaB being input into the high-frequency-component processing unit 302. The color-component weighted adding units 332R, 332G, and 332B all receive the same value of the common combination ratio ScC. By thus setting the combination ratio to the same value for each color component, the frequency pass-band of the high-frequency-component processing unit 302 is always the same for the input color-component image data DaR, DaG, and DaB, whereby unnecessary coloring can be prevented from occurring around an edge.

Supposing, for example, a case where among high-frequency color-component detection results SbR, SbG, and SbB around an edge that is contained in input image data Da, only the high-frequency green-component detection result SbG has a large value. In that case, if values of the color-component combination ratios ScR, ScG, and ScB are individually calculated as with Embodiment 3, only the green-component combination ratio ScG has a larger value than those of the red- and blue-component combination ratios ScR and ScB. Since only the frequency pass-band consequently becomes low for the green-component input image data DaG, only the signal of the combined green-component image data DbG is in a lower level than those of the combined red- and blue-component image data DbR and DbB around the edge. As a result, coloring in magenta, which is the color complementary to green, occurs around the edge.

On the other hand, setting the color-component combination ratios ScR, ScG, and ScB to the same value as with Embodiment 4, frequency pass-bands become the same for the individual color-component input image data DaR, DaG, and DaB around the edge of interest. Consequently, the signals of the combined color-component image data DbR, DbG, and DbB are in the same level, i.e., the coloring around the edge is eliminated.

As described above, an image processor according to Embodiment 4 is configured in such a manner that, for input image data Da that is composed of color-component image data having a plurality of color components, for example, color-component image data DaR, DaG, and DaB having a red, a green, and a blue components, the high-frequency component detecting unit 312 detects high-frequency color components from the color-component image data DaR, DaG, and DaB, to generate the respective high-frequency color-component detection results SbR, SbG, and SbB; the smoothing unit 311 smoothes the color-component image data DaR, DaG, and DaB on a color component basis, to output the respective smoothed color-component image data DdR, DdG, and DdB; and the image data processing unit 313B calculates common combination ratio ScC that is common to the color components from the high-frequency color-component detection results SbR, SbG, and SbB and combines the color-component image data DaR, DaG, and DaB with the smoothed color-component image data DdR, DdG, and DdB, based on the calculated common combination ratio ScC, to output the combined color-component image data DbR, DbG, and DbB, respectively. Therefore, even when input image data Da is composed of a plurality of channels, such as color image data is, a texture region can be blurred without deterioration of image quality nor occurrence of coloring, and an image can be displayed that is resistant to moiré, which would be generated in magnifying or reducing of the image.

Embodiment 5

Figure 19:
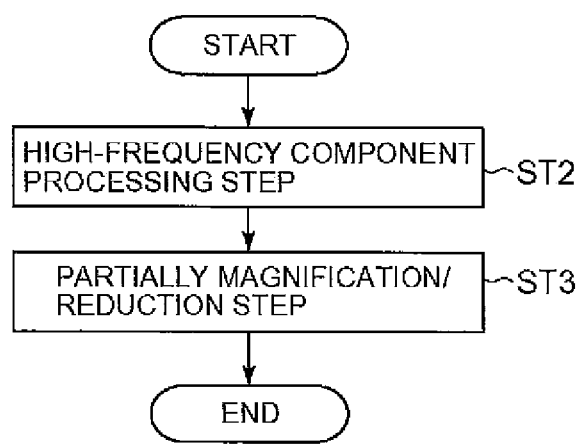
FIG. 19 is a flow diagram showing an image processing method according to Embodiment 5 of the invention.

In Embodiment 1 through Embodiment 4, the processing of moiré-causing high frequency components, that of partial magnifying or reducing for correcting image distortion and the like, are performed by the image processor. The invention, however, is not limited to these embodiments described above: all or part of these processing can also be performed by software. A flow diagram for performing the invention by software is shown in FIG. 19. An image processing by software according to Embodiment 5 includes a high-frequency component processing step ST2, and a partial magnification/reduction step ST3.

Firstly, input image data Da is read in a reading step (not shown). Then, in the high-frequency component processing step ST2, high frequency components contained in the image data is smoothed, and the smoothed image data and the input image data Da are combined and the combined image data Db is output, by a later-described method. In the partial magnification/reduction step ST3, the combined image data Db is magnified or reduced on a region basis, and the partially magnified/reduced image data is output. Then, the output partially magnified/reduced image data is projected onto, for example, the screen of a rear projection television through an image display step (not shown).

Figure 20:
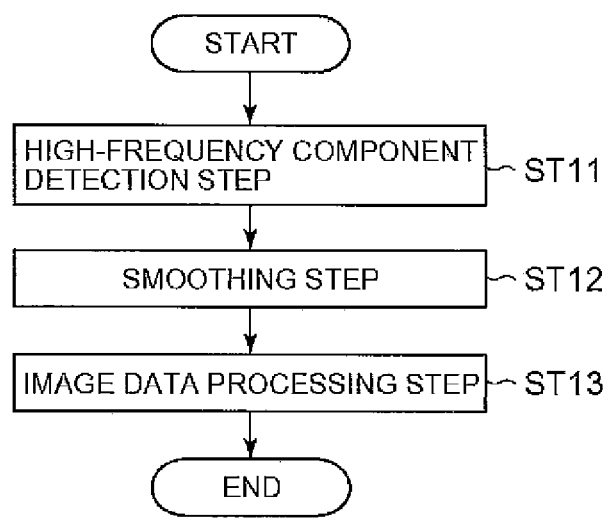
FIG. 20 is a flow diagram showing a high-frequency component processing step in the image processing method according to Embodiment 5.

FIG. 20 is a flow diagram showing in detail the high-frequency component processing step ST2: it includes a high-frequency component detection step ST11, a smoothing step ST12, and an image data processing step ST13.

In the high-frequency component detection step ST11, when the input image data Da has one channel, the same calculation is made as that in the high-frequency component detecting unit 12 or 112 described in Embodiment 1 or 2, and a high-frequency component detection result Sb is calculated out. When the input image data Da has a plurality of channels, for example, three channels: red, green, and blue, the same calculation is made as that in the high-frequency component detecting unit 312 described in Embodiment 3 or 4, and the high-frequency color-component detection results SbR, SbG, and SbB are calculated out.

In the smoothing step ST12, the input image data Da is smoothed and the smoothed image data Dd is output. Calculation in this step may be made also in the same manner as that of the smoothing unit 11 or 111 described in Embodiment 1 or 2 or that of the smoothing unit 311 described in Embodiment 3 or 4, according to the number of channels of input image data Da.

In the image data processing step ST13, the same calculation is made according to the number of channels of the input image data Da as that in the image data processing unit 13 or 113 described in Embodiment 1 or 2, or that in the image data processing unit 313 or 313b described in Embodiment 3 or 4, and the combined image data Db is calculated out.

Figure 21:
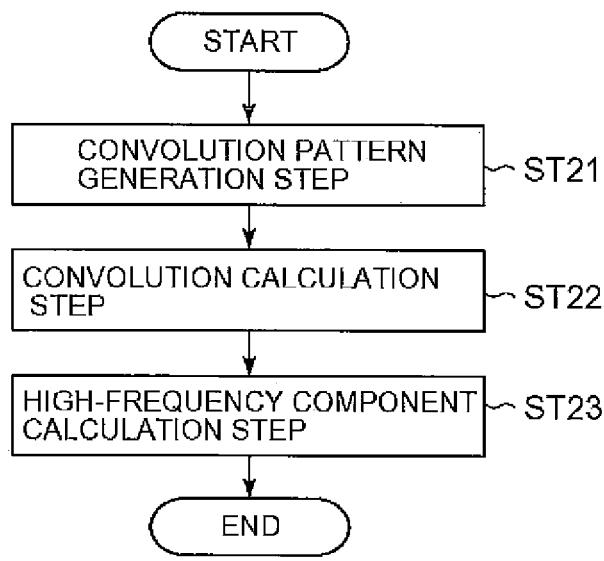
FIG. 21 is a flow diagram showing a high-frequency component detection step in the image processing method according to Embodiment 5.

FIG. 21 is a flow diagram showing in detail the high-frequency component detection step ST11. It includes a convolution-pattern generation step ST21 of generating convolution pattern data for the input image data Da; a convolution calculation step ST22 of calculating the convolution of the input image data Da and the convolution pattern data; and a high-frequency-component magnitude calculation step ST23 of calculating quantitatively how much magnitude of moiré-causing high-frequency components is contained in the input image data Da, based on the convolution result calculated in the convolution calculation step ST22. The calculations made in each steps ST21, ST22, and ST23 are the same as those in the high-frequency component detecting unit 12 or 112 described in Embodiment 1 or 2, or those in the high-frequency component detecting unit 312 described in Embodiment 3 or 4.

Figure 22:
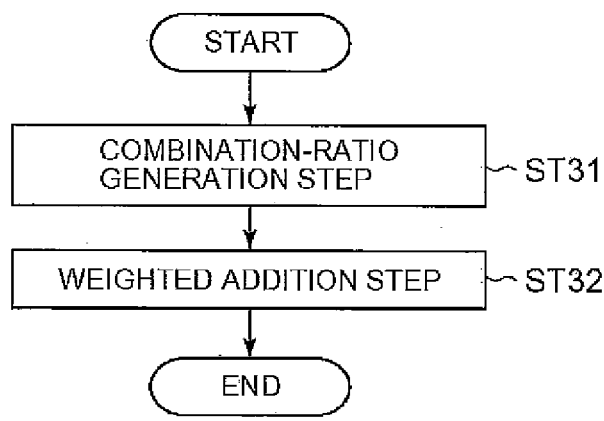
FIG. 22 is a flow diagram showing an image data combination step in the image processing method according to Embodiment 5.

FIG. 22 is a flow diagram showing in detail the image data processing step ST13: it includes a combination-ratio generation step ST31 and a weighted combination step ST32. In the combination-ratio generation step ST31, the same calculation is made as that in the combination-ratio generating unit 31 described in Embodiment 1 or 2, or that in the combination-ratio generating unit 331 or 331b described in Embodiment 3 or 4. In the weighted combination step ST32, the same calculation is made as that in the weighted adding unit 32 described in Embodiment 1 or 2, or that in the weighted adding unit 332 described in Embodiment 3 or 4. The calculation in the weighted combination step ST32 may be determined whether it is made in a manner of the weighted adding unit 32 or the weighted adding unit 332, according to the number of channels of the input image data Da. That is, when the image data Da is composed of individual color-component image data, the calculation may be made in the same manner as that of combination-ratio generating unit 331 using different combination ratios as Embodiment 3. In a case of using a common combination ratio as Embodiment 4, the calculation may be made in the same manner as that of combination-ratio generating unit 331b, which eliminates occurrence of unnecessary coloring in the image of the combined image data Db.

As described above, the image processing method according to Embodiment 5 includes the high-frequency component detection step ST11 of calculating the convolution for each pixel of interest in part of an image region of the input image data Da, and outputting the high frequency component detection result Sb on a pixel of interest basis; the smoothing step ST12 of smoothing the image data Da, and outputting the smoothed image data Dd, the image data processing step ST13 of combining based on the high frequency component detection result Sb the image data Da with the smoothed image data Dd on a pixel of interest basis, and outputting combined image data Db. Moreover, in the image data processing step ST13, the combination ratio Sc of the smoothed image data Dd is varied in such a manner that the ratio Sc becomes larger as the high frequency component detection result Sb increases. Therefore, even when moiré-causing high frequency components are contained in part of image region of the input image data Da, a texture region can be blurred without deterioration of image quality, and an image can be displayed that is resistant to moiré, which would be generated in magnifying or reducing of the image.

According to the software processing described above, the same operations are realized as that of any one of the image processor described in Embodiment 1 through Embodiment 4. Consequently, brought about are the same effects as those of any one of the image processor described in Embodiment 1 through Embodiment 4. Furthermore, the software processing described above can be used for part of operations in an image display device similarly to any one of the image processor described in Embodiment 1 through Embodiment 4. In that case, the same operations and the same effects are brought about as those of any one of the image processor described in Embodiment 1 through Embodiment 4.

What is claimed is:

1. An image processor comprising:
    a high-frequency component detecting unit that detects high frequency components contained in image data by calculating a convolution for a pixel group of the image data, to output the detection result;
    a smoothing unit that smoothes the image data, to output the smoothed image data, wherein the smoothing unit generates the smoothed image data for each of pixels of interest in an image region of the image data from data of pixels contained in a region to be smoothed that is composed of one of the pixels of interest and pixels around the pixel of interest and wherein the number of pixels in the region to be smoothed is set smaller than that of pixels in the pixel group to be calculated; and
    an image data processing unit that combines the image data with the smoothed image data at a combination ratio determined from the detection result, to output the combined image data.

2. The image processor of claim 1, wherein the high-frequency component detecting unit comprises:
    a convolution pattern generating unit that generates convolution pattern data for the convolution calculation;

a convolution calculating unit that calculates the convolution of the image data and the convolution pattern data for each of regions of interest composed of a pixel or a pixel group of the image data, to output the convolution result;

a high-frequency-component magnitude calculating unit that outputs the absolute value of the convolution result as a high-frequency component detection result; wherein the convolution is calculated for a pixel group composed of a plurality of pixels covering at least the region of interest, and the convolution pattern data is composed of coefficients whose positive and negative signs are alternately changed for each of successive pixels in the pixel group to be calculated.

3. The image processor of claim 1, wherein the region to be smoothed is composed of the pixel of interest and a pixel adjacent thereto.

4. The image processor of claim 2 further comprising an image data holding unit that holds and outputs image data for a plurality of lines of the image data, wherein the convolution pattern generating unit generates data having two-dimensional convolution patterns each corresponding to different types of high frequency components; and the convolution calculating unit calculates convolutions of the image data for the plurality of lines and the data having each two-dimensional convolution pattern, to output the calculated convolution results.

5. The image processor of claim 1, wherein the image data is composed of color-component image data having a plurality of color components;

the high-frequency component detecting unit detects high-frequency color components from the color-component image data, to generate the respective high-frequency color-component detection results;

the smoothing unit smoothes the color-component image data on a color component basis, to output the respective smoothed color-component image data; and the image data processing unit combines based on the high-frequency color-component detection results the color-component image data with the smoothed color-component image data on a color component basis, to output the respective color-component combined image data.

6. The image processor of claim 1, wherein the image data is composed of color-component image data having a plurality of color components;

the high-frequency component detecting unit detects high-frequency color components from the color-component image data, to generate the respective color high frequency component detection results;

the smoothing unit smoothes the color-component image data on a color component basis, to output the respective smoothed color-component image data; and the image data processing unit calculates a common high-frequency component detection result common to the color components, from the high-frequency color-component detection results, and combines based on the calculated common high-frequency component detection result the color-component image data with the respective smoothed color-component image data, to output the respective color-component combined image data.

7. The image processor of claim 1 further comprising a magnifying/reducing unit that magnifies or reduces the combined image data on a region basis.

8. The image processor of claim 1 further comprising a processing unit that corrects for the combined image data a key stone distortion.

9. An image display device comprising:

a light source that emits light;

a modulator that modulates according to control signals the emitted light incident thereon from the light source;

a projection lens that projects the modulated light by the modulator; and an image processor that processes image data to generate according to the processed image data the control signals to be output to the modulator; wherein the image processor comprising:

a high-frequency component detecting unit that detects high frequency components contained in image data by calculating a convolution for a pixel or a pixel group of the image data, to output the detection result;

a smoothing unit that smoothes the image data, to output the smoothed image data, wherein the smoothing unit generates the smoothed image data for each of pixels of interest in an image region of the image data from data of pixels contained in a region to be smoothed that is composed of one of the pixels of interest and pixels around the pixel of interest and wherein the number of pixels in the region to be smoothed is set smaller than that of pixels in the pixel group to be calculated; and an image data processing unit that combines the image data with the smoothed image data at a combination ratio determined from the detection result, to output the combined image data.

10. The image display device of claim 9, wherein the image processor further comprises a magnifying/reducing unit that magnifies or reduces the combined image data on a region basis.

11. The image display device of claim 9, wherein the image processor further comprises a processing unit that corrects for the combined image data a key stone distortion.

12. An image processing method comprising:

a step of detecting high frequency components contained in image data by calculating a convolution for a pixel or a pixel group of the image data, and outputting the detection result;

a step of smoothing the image data, and outputting the smoothed image data, wherein the step of smoothing the image data comprises generating the smoothed image data for each of pixels of interest in an image region of the image data from data of pixels contained in a region to be smoothed that is composed of one of the pixels of interest and pixels around the pixel of interest and wherein the number of pixels in the region to be smoothed is set smaller than that of pixels in the pixel group to be calculated; and a step of combining the image data with the smoothed image data at a combination ratio determined from the detection result, and outputting the combined image data.

* * * * *